United States Patent [19]

Sekine et al.

[11] Patent Number: 5,576,847
[45] Date of Patent: Nov. 19, 1996

[54] IMAGE PROCESSING SYSTEM

[75] Inventors: Hiroshi Sekine, Ebina; Kiyomasa Endo, Tokyo, both of Japan

[73] Assignee: Fuji Xerox Co., Ltd., Tokyo, Japan

[21] Appl. No.: 438,989

[22] Filed: May 11, 1995

Related U.S. Application Data

[63] Continuation of Ser. No. 882,135, May 13, 1992, abandoned.

[30] Foreign Application Priority Data

May 14, 1991 [JP] Japan .................................... 3-107972

[51] Int. Cl.⁶ .................................................. H04N 1/40
[52] U.S. Cl. ........................ 358/448; 358/404; 358/444;
358/452; 358/453; 358/537; 358/538; 395/133;
395/134
[58] Field of Search .................................... 358/404, 452,
358/453, 444, 448, 524, 537, 538; 395/133,
134, 135, 164

[56] References Cited

U.S. PATENT DOCUMENTS 5,018,083  5/1991  Wantonabe et al. .................... 364/523
5,113,251  5/1992  Ichiyanagi et al. ..................... 358/500
5,142,355  8/1992  Fujima .................................... 358/75

*Primary Examiner*—Edward L. Coles, Sr.
*Assistant Examiner*—Thomas L. Stoll
*Attorney, Agent, or Firm*—Finnegan, Henderson, Farabow, Garrett & Dunner, L.L.P.

[57] ABSTRACT

In an image processing system, there are provided a plurality of plane memories for setting edit commands, a user interface for inputting edit functions, designation of area and instruction for execution, and an edit processing unit for setting and reading the edit commands to plane memories based on the edit functions, designation of area and instruction for execution. The edit processing unit collectively processes extraction and deletion areas after setting the other areas. Further, after depicting an area on a plane for work, the edit processing unit develops content for work for a plane memory for area command setting by logic processing with priority on later designation. By this arrangement, procedures are simplified in edit processing which requires many extractions and deletions, and the time for processing can be reduced.

7 Claims, 15 Drawing Sheets

FIG. 4A
PRIOR ART
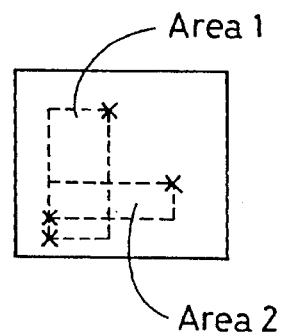
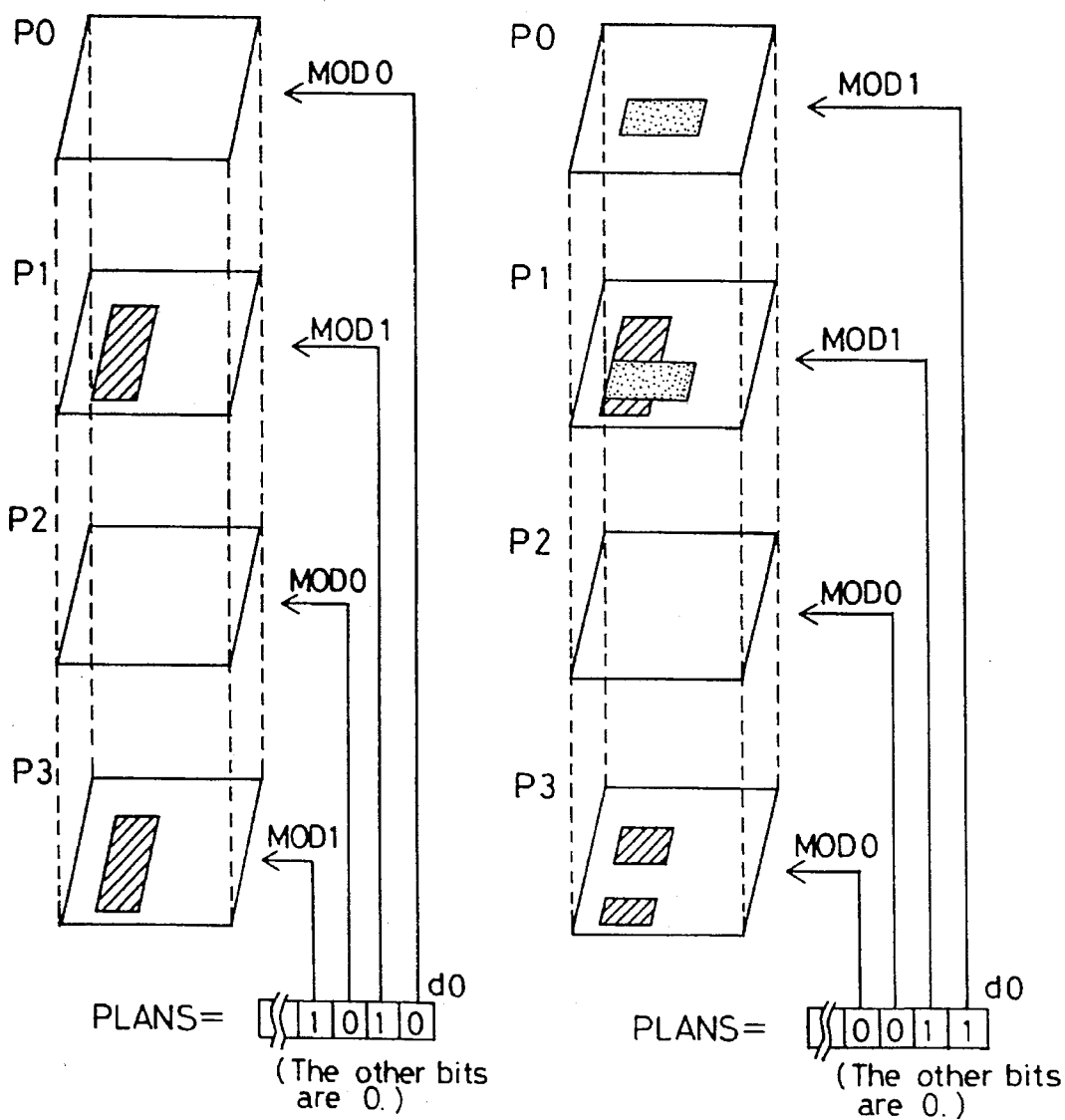
FIG. 4B
PRIOR ART
FIG. 4C
PRIOR ART

FIG. 7
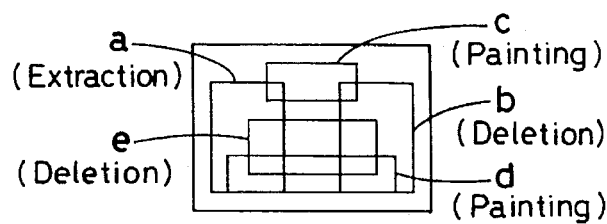
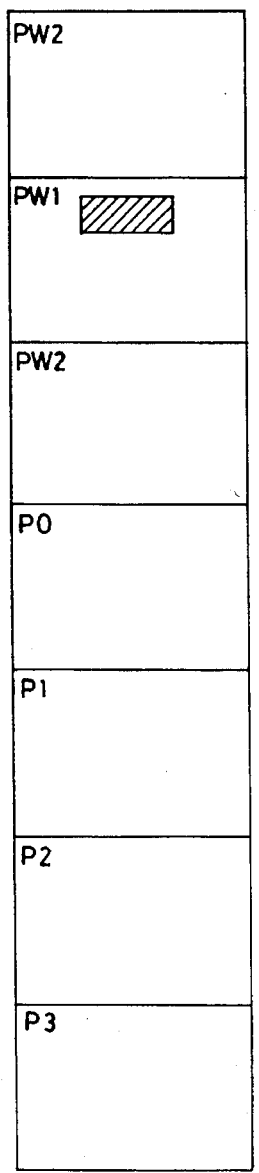 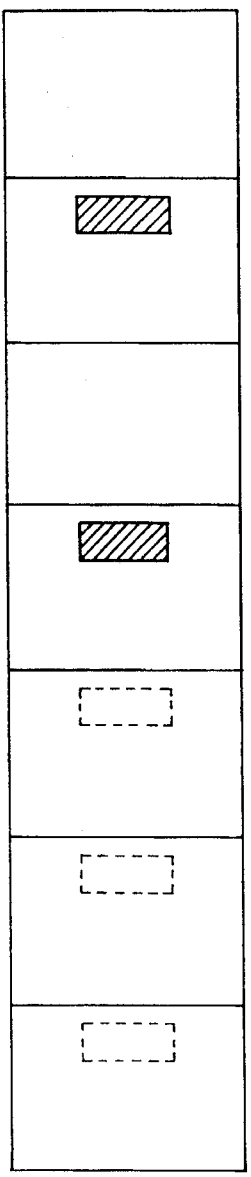 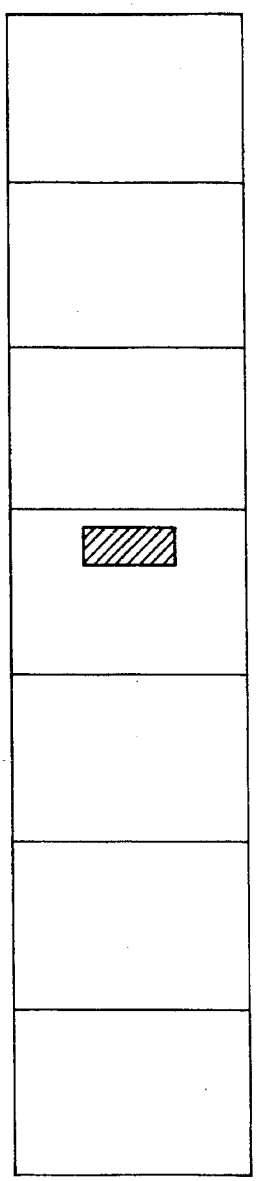 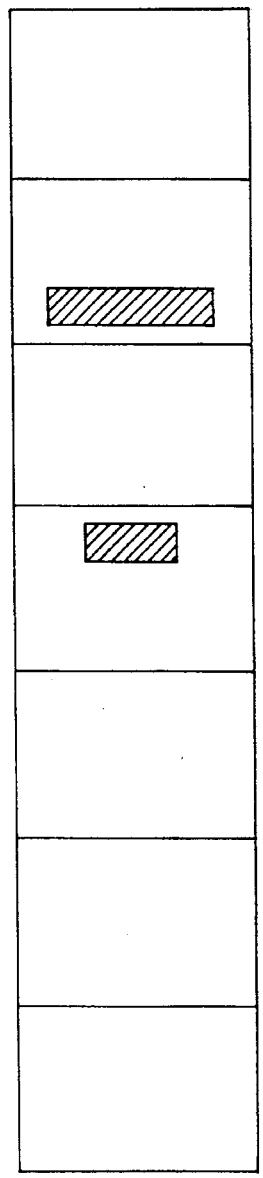
FIG. 8A     FIG. 8B     FIG. 8C     FIG. 8D

IMAGE PROCESSING SYSTEM

This application is a continuation of application Ser. No. 07/882,135, filed May 13, 1992, now abandoned.

BACKGROUND OF THE INVENTION

The present invention relates to an image processing system for executing edit processing to image data by arranging edit commands for each area.

A digital copying machine comprises an IIT (image input terminal) for reading a manuscript, an IPS (image processing system) for processing image data thus read, and an IOT (image output terminal) for outputting a copy based on the image data by driving a laser printer, for example. In the IIT, image information of the manuscript is picked up as an analog electric signal corresponding to reflectivity using a CCD (charge-coupled device) sensor, and this is converted to multi-gradation digital image data. In the IPS, the image data obtained at the IIT are processed, by executing correction, conversion, editing, etc. In the IOT, a half-tone image is outputted by turning a laser of a laser printer on and off based on the image data processed in the IPS.

In the above digital copying machine, it is possible to output an image from multi-gradation image data depending upon the type by the processing of IPS, i.e. to output a sharp image with edge enhancement in case of characters, a smoothened image by eliminating moiré and half-tone dots in case of intermediate tone such as photographs, or a color image with high reproducibility and adjusted definition. Further, it is possible to add edit functions such as trimming (extraction of image) and masking (erasing of image) from the manuscript and, in addition, insertion of logo, coloring, painting, color conversion, negative-positive inversion, scaling down/up, shifting, etc. In contrast to this IPS, the IIT reads the manuscript by signals, separating it into 3 primary colors of R (red), G (green) and B (blue), and converts it to a digital signal and outputs. In the IOT, the image is outputted by overlapping half-tone images in the colors Y (yellow), M (magenta), C (cyan) and K (black). Thus, a color digital copying machine is provided. Accordingly, in a color image processing system such as the above color digital copying machine, color material developing machines are used, and 4 scannings are repeated for development process for each color material, and the full-color image data read from the manuscript are processed each time.

Description will be given now on general features of a color digital copying machine as above, taking an example on an arrangement proposed by the present applicant (e.g. U.S. patent application No. 482,977, filed Feb. 22, 1990, now U.S. Pat. No. 5,113,251 issued May 12, 1992). FIG. 1 is a block diagram for a conventional-type color digital copying machine.

In FIG. 1, the IIT 100 reads a color manuscript by separating it into 3 primary colors of B, G and R using a CCD line sensor and converts it to digital image from data. IOT 115 performs exposure and developing by a laser beam and reproduces a color image. The components from the END conversion circuit 101 to the IOT interface 110 arranged between IIT 100 and IOT 115 constitute an edit processing system of the image data (IPS: image processing system). The image data of B, G and R are converted to colors of Y, M and C, and further, to K, and a color signal corresponding to each developed color in each development cycle is outputted to the IOT 115.

In the IIT 100, one pixel is read in size of 16 dots/mm for each color of B, G and R using a CCD sensor, and the data are outputted in 24 bits (3 colors×8 bits; 256 gradations). The CCD sensor is provided with filters for B, G and R on its upper surface, and it has a length of 300 mm with density of 16 dots/mm. Scanning of 16 lines/mm is performed at a process speed of 190.5 mm/sec, and the read data are outputted at a speed of 15M pixels per second for each color. In the IIT 100, analog data of pixels of B, G and R are converted from reflectivity information to density information through log conversion and further to digital data.

In the IPS, color separation signals of B, G and R are inputted from the IIT 100. After various data processings to increase color reproducibility, gradation reproducibility, definition reproducibility, etc., a color signal of a development process color is outputted to the IOT through on-off conversion. The END (equivalent neutral density of a color) conversion module 101 adjusts (converts) the signal to a gray-balanced color signal, and a color masking module 102 converts that signal to a signal corresponding to a quantity of color material of Y, M and C through matrix computation of B, G and R signals. A manuscript size detection module 103 detects manuscript size during pre-scanning and erases (frame erasing) platen color during manuscript reading scanning. A color conversion module 104 converts color specified in a specific area according to an area signal inputted from an area image control module. A UCR (under color removal) & black generation module 105 generates an adequate quantity of K not to cause color turbidity and decreases the equivalent quantity of Y, M and C according to the above quantity. At the same time, the K signal and the signal after under color removal of Y, M and C are gated according to each signal in a mono-color mode and a 4-full-color mode. A space filter 106 is a non-linear digital filter provided with a function to restore blur and a function to remove moiré. TRC (tone reproduction control) module 107 performs density adjustment, contrast adjustment, negative/positive inversion, color balance adjustment, etc. to increase reproducibility. A scaling up/down module 108 scales up or down in fast scanning direction. The scaling up and down in slow scanning direction is performed by adjusting the scanning speed of the manuscript. A screen generator 109 converts color signal of process color expressed in multiple gradations to binarized signals according to gradations and outputs them. The binarized color signals are outputted to IOT 115 through an IOT interface module 110. An area image control module 111 comprises an area generation circuit and a switch matrix. An edit control module comprises an area command memory 112, a color palette video switch circuit 113, and a font buffer 114, etc. It performs various edit controls.

In the area image control module 111, 7 rectangular areas and priority can be set in the area generation circuit, and area control information is set on the switch matrix depending upon each area. As the control information, there are information for color conversion, color mode (i.e. mono-color or full-color), modulation select information for photograph or characters, TRC select information, and screen generator select information, etc. These are used for the control of color masking module 102, color conversion module 104, UCR module 105, space filter 106, and TRC module 107. The switch matrix can be set by software.

The edit control module reads a manuscript of circular graph, not rectangular, and performs painting processing to fill a specified area of any shape with a specified color. An area command of 4 bits is written on 4 plane memories, and an edit command at each point of the manuscript can be set with 4 bits of 4 plane memories.

FIG. 2 shows an arrangement of plan memories, which comprise two binary planes for work and 4 planes for picture depicting. The plane memories perform processing in a predetermined area and there is no need to have as high resolution as that of an inputted image. Thus, resolution is reduced to 4 bits/mm to decrease memory capacity. The plane memories comprise four planes in A3 size of 432 mm in slow scanning direction and 300 mm in fast scanning direction, and the color and pattern corresponding to a bit image written on the four planes are delivered. Therefore, processings of $2^4$, i.e. 16 types, can be executed. The functions can be roughly divided to: "coloring within a closed area" (painting) to paint a white portion in a closed area containing a specified point with any color and pattern as desired, and "coloring in a rectangular area" to paint a space within a rectangular area specified by two points with any color and pattern as desired. As such processings, there are: coloring within a frame by specifying a point within an area, color conversion to convert black color on a black/white manuscript to a color desired by specifying an area by a marker, netting to leave an original image of the manuscript, masking to paint a space within an area with white color (to make it transparent), trimming to paint a space outside an area with white color, specified shifting similar to extraction, and painting not to leave original image of the manuscript.

FIG. 3 shows the relationship between contents of pictures on planes and area commands. A plane PW for work incorporates binarized data during painting scanning, for example. It can also be used for incorporating a marker area during marker scanning. A plane PM for work is used for depicting a picture in the painted area and for preparing an extraction area. Planes P3–0 for storing commands use bit patterns as area commands. In this case, the relationship between the contents of pictures on the planes P3–P0 and the area commands is as shown in FIG. 3. Specifically, if there are P3, P2, PI and P0 with 4 bits, area command for an area (1) in this figure is "$0111_B$" ($07_H$) because the plane P3 is "0", and each of the planes P2, P1 and P0 is "1". The area command for an area (2) is "$1010_B$" ($0A_H$) because each the planes P3 and PI is "1". The area command of an area (3) is "$0000_B$" (0) because all planes are "0".

FIGS. 4A–4C are drawings for explaining picture depicting with priority on later designation.

As shown in FIG. 4A, in case a user sets an area 1 and then an area 2, the area 1 is written on a plane memory by an area command $1010_B$ (10) as shown in FIG. 4B. Then, the area 2 is written over it by an area command $0011_B$ (3). As the result, priority is given on the area 2 over the area 1.

FIGS. 5A–5G show examples of a plane memory development processing system of conventional type.

In the conventional system, extraction areas "a" and "b" are depicted on a plane PM for work and a plane P0 for command setting, and a painting area "c" is developed on planes P0–P3 for command setting as area command 2 as shown in FIG. 5C. In the development processing ($0010_B$) in this case, the area "c" is copied by OR logic processing on the plane P1, and it is copied on the planes P0, P2 and P3 by inverted AND logic processing. For a painting area "d", similar processing is performed as shown in FIG. 5D as area command 3 ($0011_B$).

Then, as shown in FIG. 5E, the extraction areas "a" and "b" depicted on the plane PM for work are copied by AND logic processing on the planes P0–P3 for storing commands, and a deletion area "e" is developed on the planes P0–P3 for storing commands as an area command 4 as shown in FIG. 5F. In the development processing ($0100_B$) in this case, the area "e" is copied by OR logic processing on the plane P2 and is copied on the planes P0, P1 and P3 by inverted AND logic processing. Finally, as shown in FIG. 5G, the extraction areas "a" and "b" depicted on the plane PM for work are cleared.

As described above, there are many deletion areas in the conventional system. For example, in case of edit processing using a table, the same command is developed on the planes P0–P3 for storing commands for each area. For this reason, there arise problems of low processing efficiency and much processing time.

SUMMARY OF THE INVENTION

It is an object of the present invention to increase efficiency in processing of extraction and deletion areas, via the same command. It is another object of the invention to collectively develop extraction and deletion areas by synthesizing them.

To attain the above objects, the image processing system for executing edit processing to image data by storing edit commands for each area comprises a plurality of plane memories for storing edit commands, user interface means for specifying edit functions and areas and for inputting instructions for execution, and edit processing means for storing and reading edit commands to the plane memories based on the edit functions, area designation and the instruction for execution, whereby the edit processing means carries out processings for extraction and deletion areas after the other areas.

The plane memories consist of those for work and those for storing area commands. After an area has been depicted on a plane memory for work, the edit processing means develops content of the plane memory for work on a plane for area command by logic processing with priority on later designation.

Also, the edit processing means copies an extraction area on one of the plane memories for work and prepares an inverted copy of a deletion area on another plane for work. After the two areas have been copied by AND processing, they are developed on the plane memories for storing area commands. After the extraction area has been depicted on one of the plane memories for work, it is copied on the other plane memory for work by OR logic processing. "1" is depicted on one of the plane memories for work, and the deletion area depicted on the other plane memory for work is copied by inverted AND processing.

In the above arrangement, there are provided a plurality of plane memories for storing edit commands, user interface means for inputting edit functions, area designation and instruction for execution, and edit processing means for storing and reading edit commands to the plane memories based on the edit function, area designation and instruction for execution, and the edit processing means collectively processes extraction and deletion areas after the other areas. Thus, the processing can be simplified in the edit processing requiring many extractions and deletions, and the time for processing can be reduced.

Still other objects and advantages of the invention will in part be obvious and will in part be apparent from the specification.

The invention accordingly comprises the features of construction, combinations of elements, and arrangement of parts which will be exemplified in the construction hereinafter set forth, and the scope of the invention will be indicated in the claims.

BRIEF DESCRIPTION OF THE DRAWINGS

FIGS. 4A–4C are drawings for explaining picture depicting with priority on later designation;

FIG. 7 shows examples of storage areas;

DESCRIPTION OF THE PREFERRED EMBODIMENTS

Figure 1:
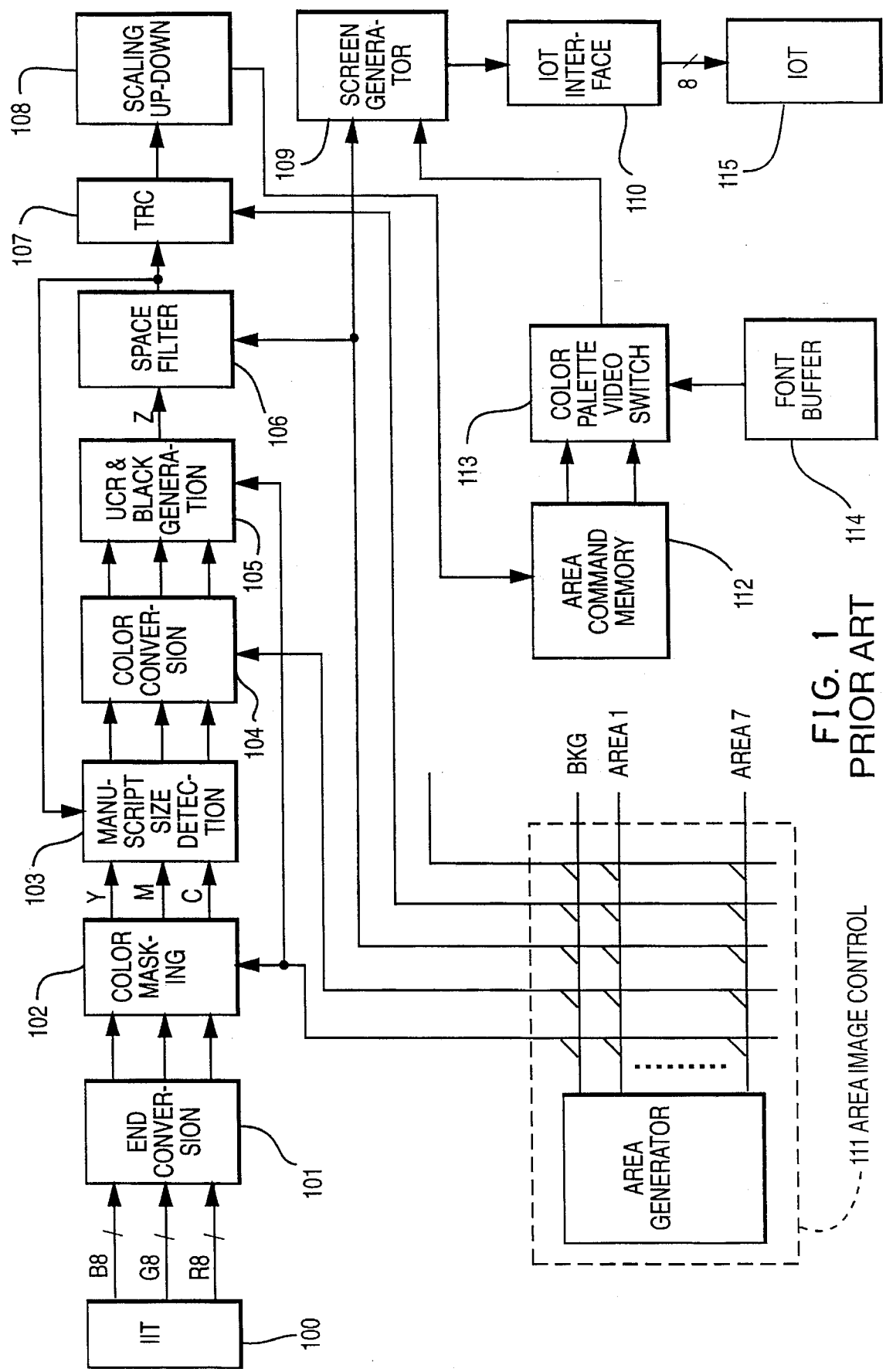
FIG. 1 is a block diagram of a conventional type color digital copying machine.
Figure 2:
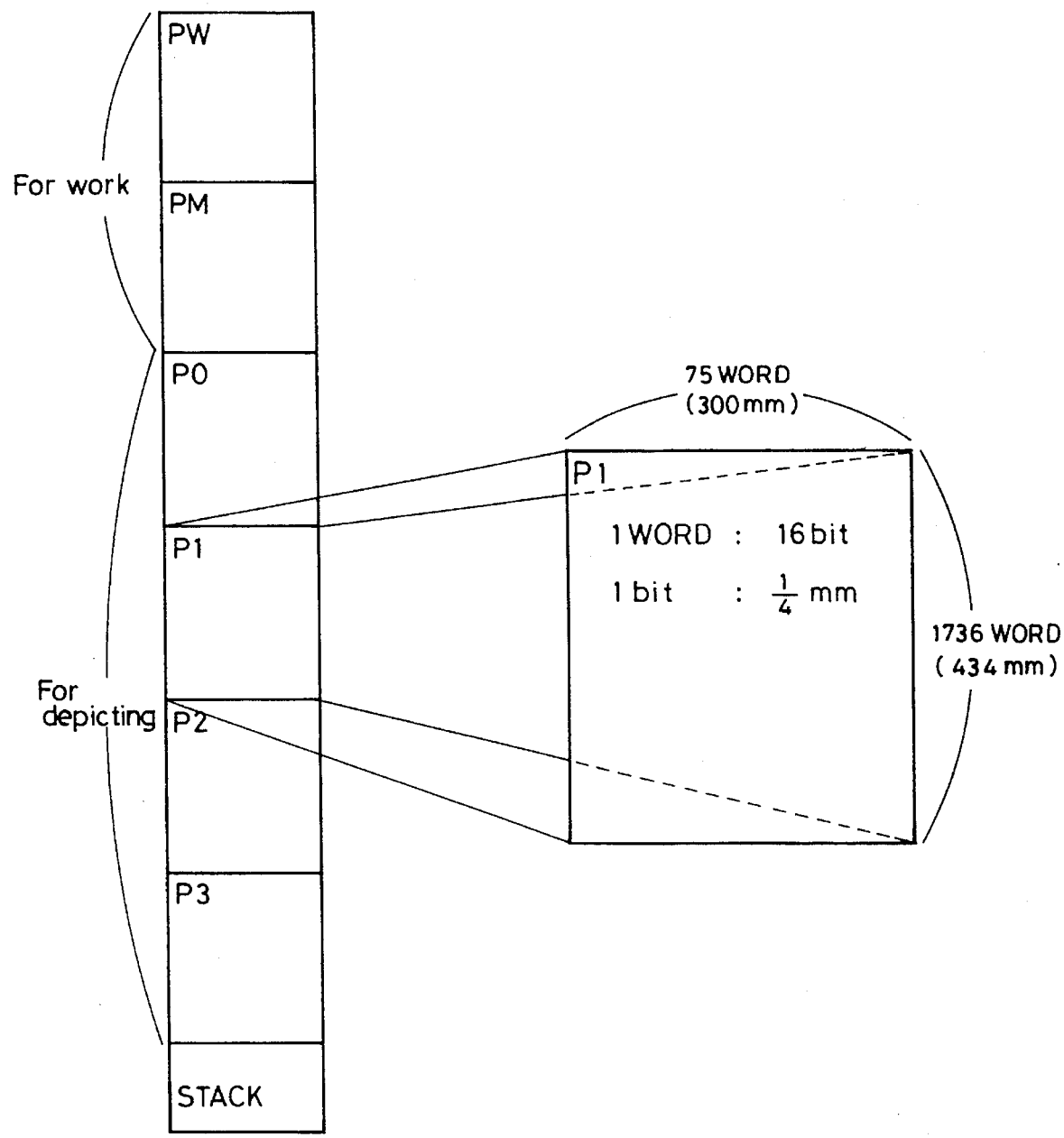
FIG. 2 shows an arrangement of plane memories.
Figure 3:
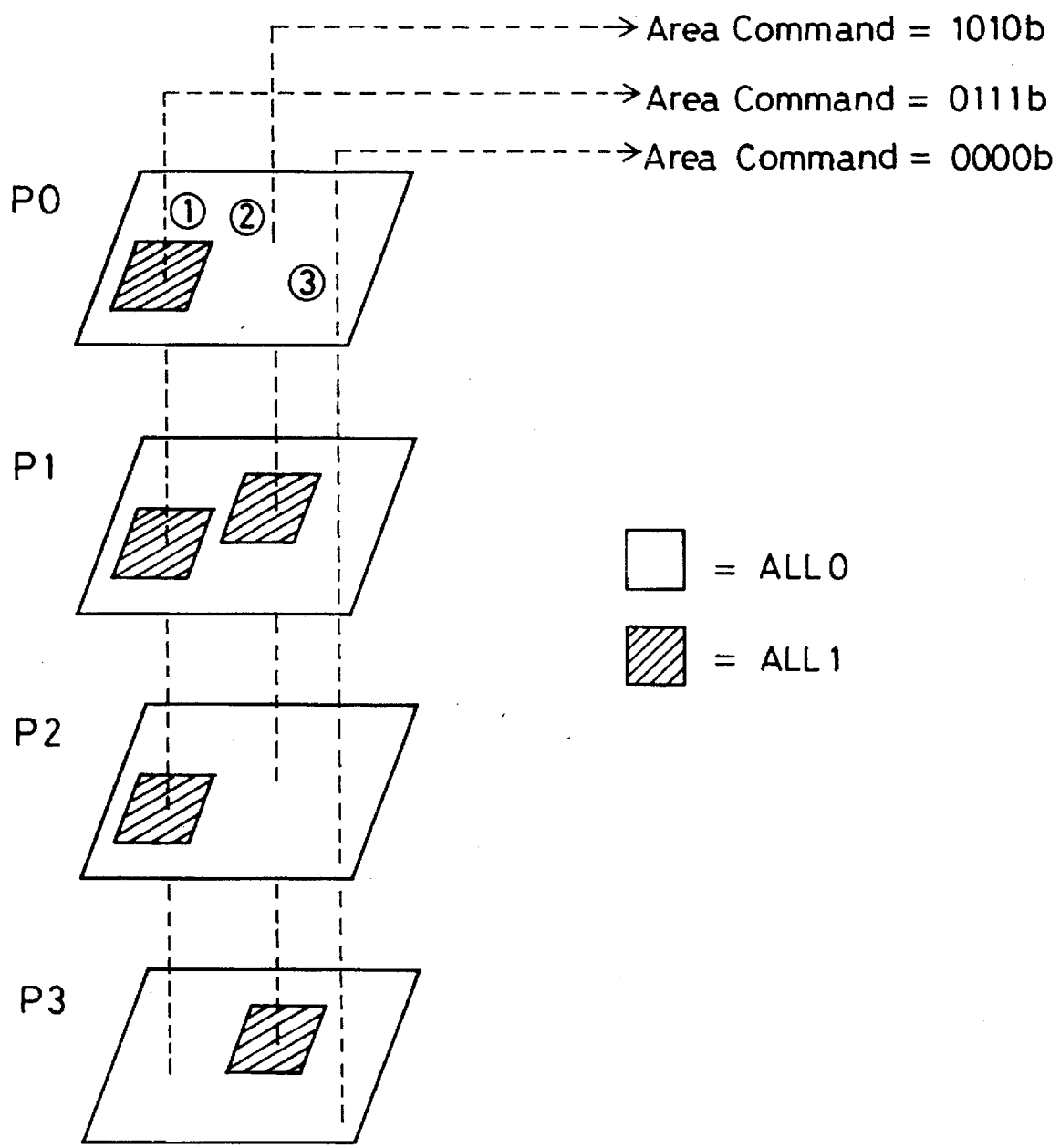
FIG. 3 represents the relationship between content of images depicted on planes and area commands.
Figure 5:
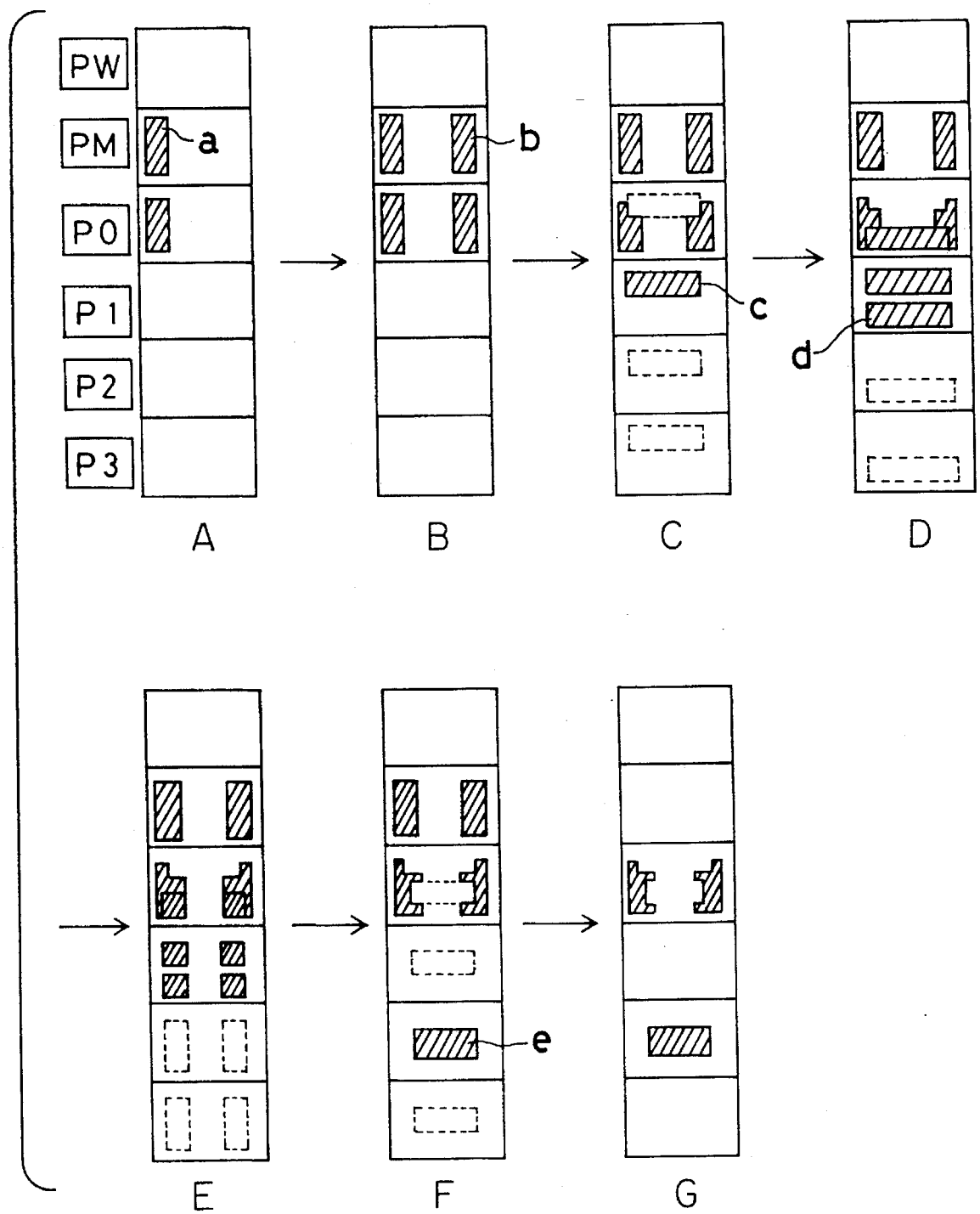
FIGS. 5A–5G are drawings for explaining conventional development processing of plane memories.
Figure 6:
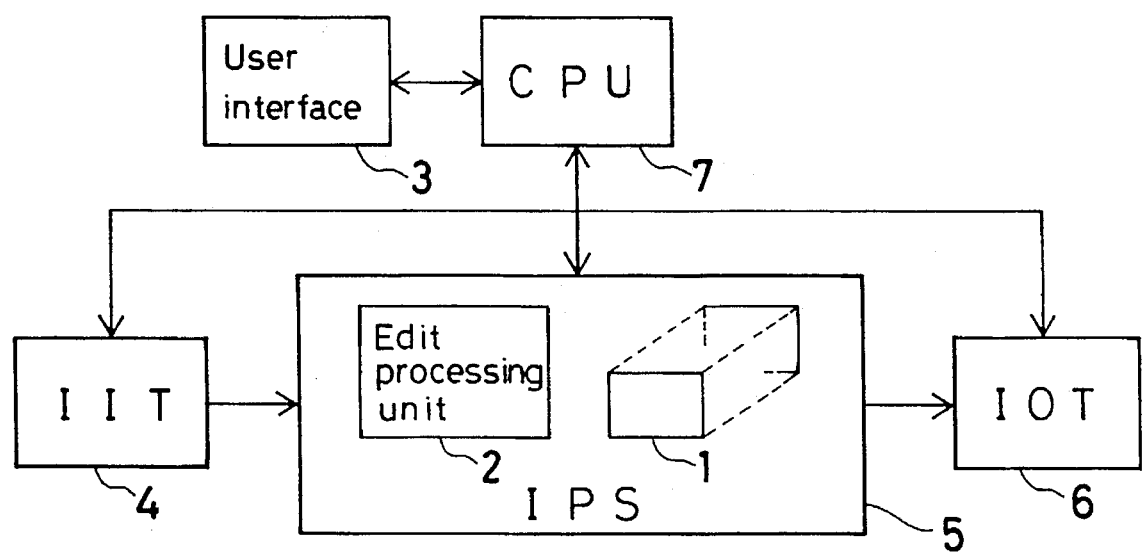
FIG. 6 is a block diagram for an embodiment of an image processing system of the present invention.

In FIG. 6, IIT 4 is an image input terminal for reading a manuscript by a CCD sensor, and IPS 5 is an image processing system comprising a plane memory 1 and edit processing means 2 for performing editing and other processings on image data. IOT 6 is an image output terminal for outputting a copy based on image data, for example, by driving a laser printer. User interface 3 comprises a control panel, edit pad, display, etc. and specifies edit functions, inputs areas, inputs and confirms execution condition and instructs execution. CPU 7 sets parameters and edit data such as color conversion, color adjustment, etc. of IPS 5 based on the conditions specified by the user interface 3 and controls operation of IIT 4 and IOT 6.

The plane memory 1 stores area commands for trimming (image extraction), masking (image erasing), and further, insertion of logo, coloring, painting, etc. An area command for each point on the manuscript is set with "n" bits by "n" pieces of planes. In addition, there are three planes for work. Edit processing unit 2 stores an area command transferred from CPU 7 according to input from the user interface 3 on the plane memory 1 when edit functions are stored, and performs edit processing to image data by reading the area command from the plane memory 1 when edit functions are executed.

In the image processing system of the present invention, when an area command is stored in the plane memory 1 by the edit processing unit 2, the area commands other than extraction and deletion are depicted and set with priority on later designation. After synthesizing extraction and deletion in a plane memory for work finally, they are synthesized in a plane memory for storing edit commands. Thus, processing is simplified. In the following, description will be given of an example of development processing where areas of FIG. 7 are stored.

First, a painting area "c" is depicted on a plane memory PW for work as shown in FIG. 8A, and the depicted area "c" is developed on plane memories P0–P3 as area command 1 as shown in FIG. 8B. In the development processing ($0001_B$) in this case, the area "c" depicted on the plane memory PW for work is copied by OR logic processing on the plane memory P0 and is copied on the plane memories PI–P3 by inverted AND logic processing. Then, an shown in FIG. 8C, the plane memory PW1 for work is cleared.

Figure 8E:
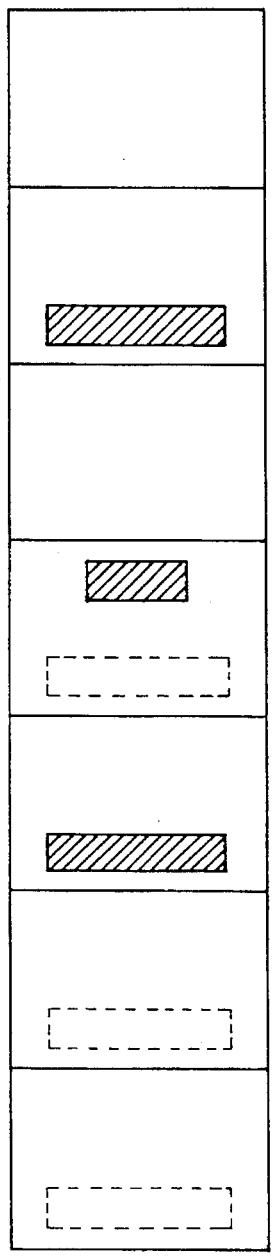
FIG. 8A–8T show examples of plane memory development processing.
Figure 8F:
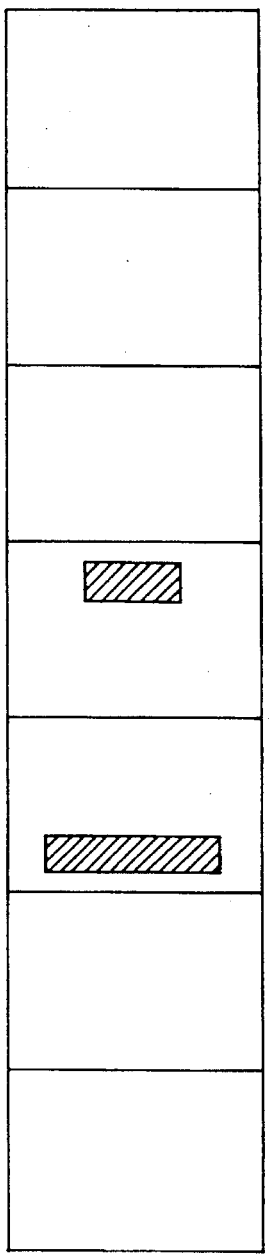

Then, a painting area "d" is depicted on the plane memory PW1 for work as shown in FIG. 8D, and the depicted area "d" is developed on the plane memories P0–P3 as area command 2 as shown in FIG. 8E. In the development processing ($0010_B$) in this case, the area "d" depicted on the plane memory PW1 for work is copied on the plane memory P1 by OR logic processing and is copied on plane memories P0, P2 and P3 by inverted AND logic processing. Then, the plane memory PW1 for work is cleared as shown in FIG. 8F.

Figure 8G:
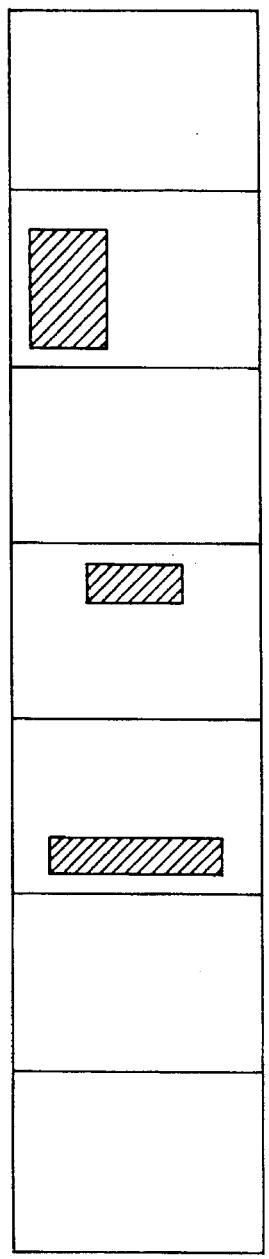
Figure 8H:
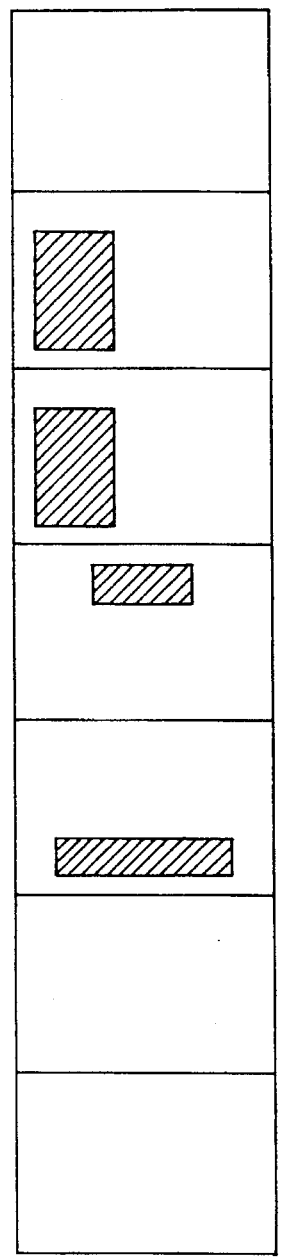
Figure 8I:
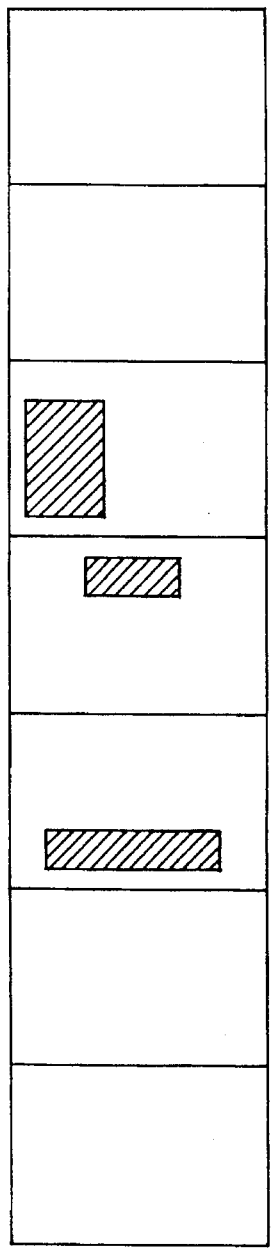
Figure 8J:
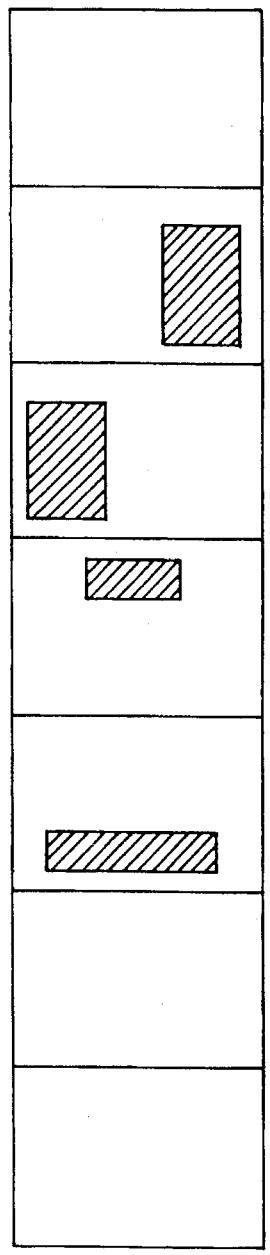
Figure 8K:
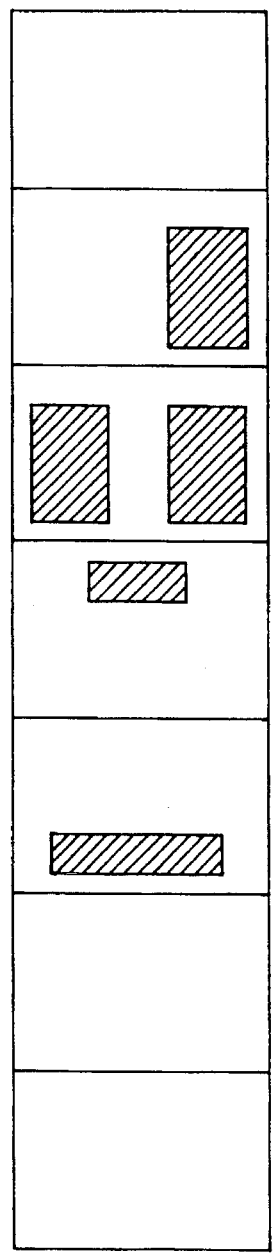
Figure 8L:
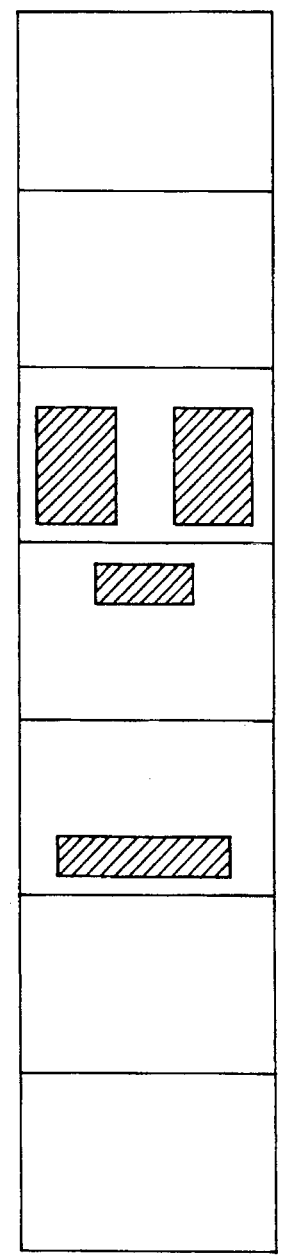

In this way, all area processings such as painting are performed, and if there is no area other than extraction and deletion, the following processing for extraction and deletion areas is carried out. First, an extraction area "a" is depicted on a plane memory PW1 for work as shown in FIG. 8G and is copied on the plane memory PW2 for work by OR logic processing as shown in FIG. 8H. Then, as shown in FIG. 8I, the plane memory PW1 for work is cleared. For the extraction area "b", the same processing is carried out as shown in FIGS. 8J–8L.

Figure 8M:
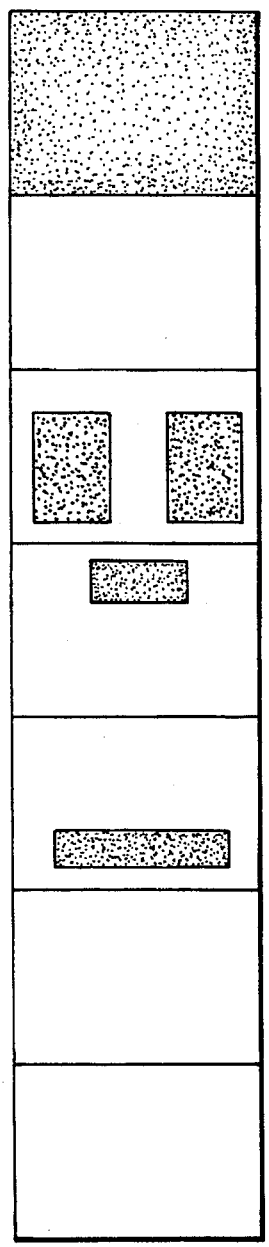
Figure 8N:
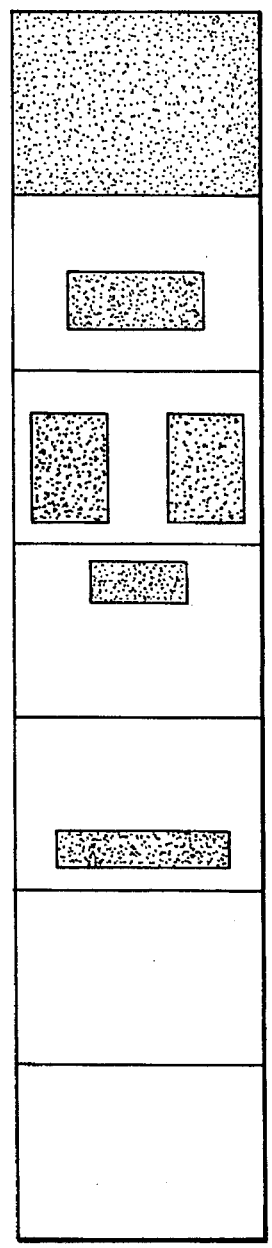
Figure 8O:
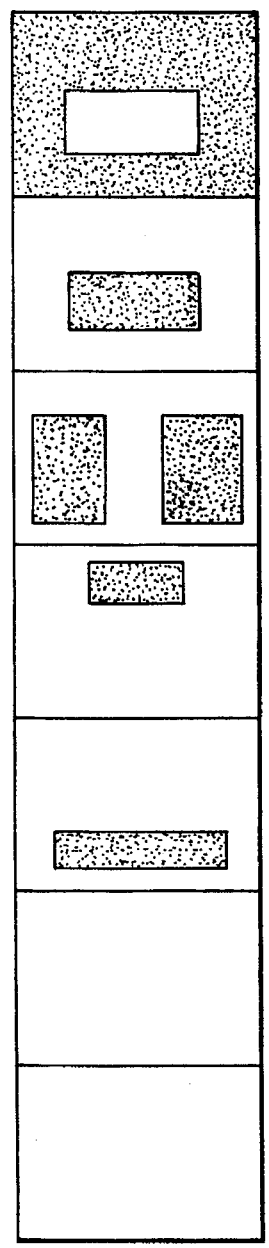
Figure 8P:
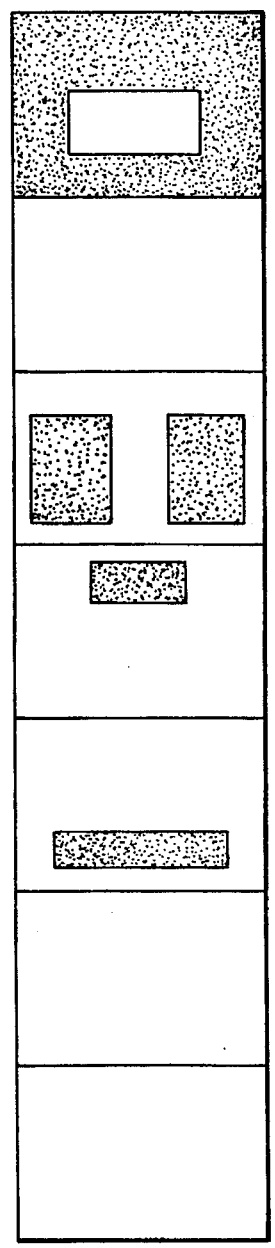
Figure 8Q:
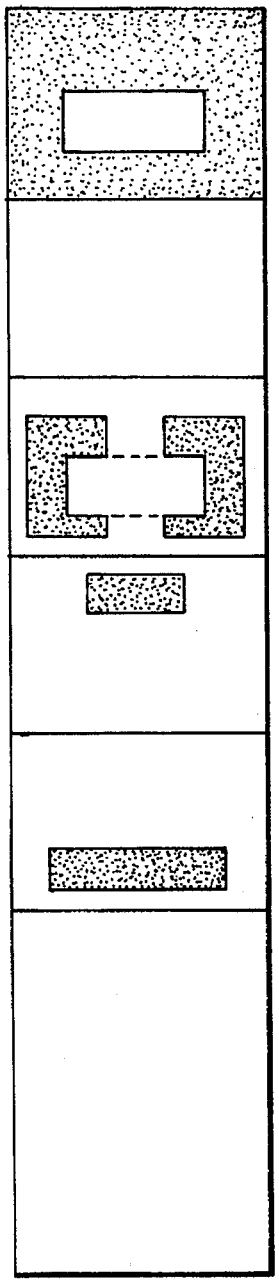
Figure 8R:
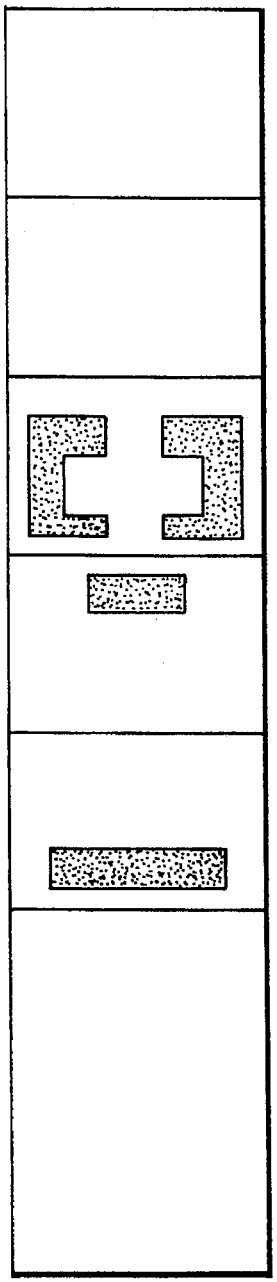
Figure 8S:
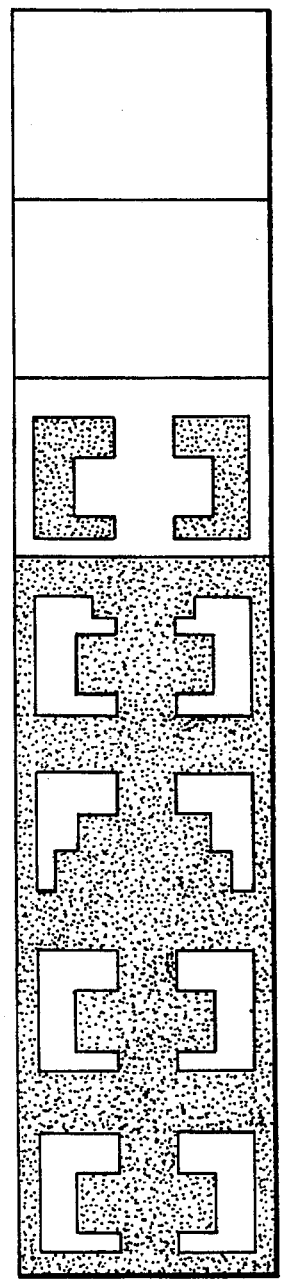
Figure 8T:
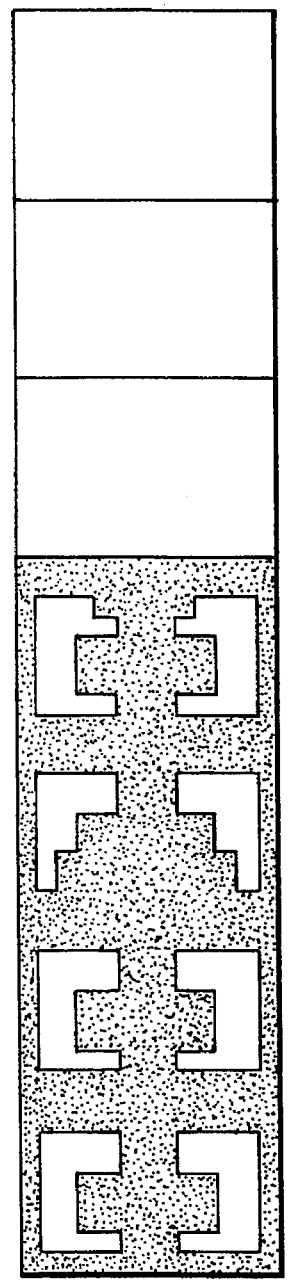

Then, total plane memory "1" is depicted on the plane memory PW0 for work as shown in FIG. 8M, and a deletion area "e" is depicted on the plane memory PW1 for work as shown in FIG. 8N. Further, this is copied on the plane memory PW0 for work by inverted AND processing as shown in FIG. 8O. As shown in FIG. 8P, the plane memory PW1 for work is cleared, and the area on the plane memory PW0 for work is copied to the plane memory PW2 for work by AND processing as shown in FIG. 8Q. Then, the plane memory PW0 is cleared as shown in FIG. 8R. Finally, the data on the plane memory PW2 for work are developed on the plane memories P0–P3 as area commands IS as shown in FIG. 8S (copied by inverted OR processing). Then, the plane memory PW2 is cleared as shown in FIG. 8T. Thus, the processing is completed.

By the above processing, an area prepared by synthetic processing of extraction and deletion is copied to the plane memory PW2 for work. On the plane memories P0–P3, all area commands such as painting "c", "d", etc. except extraction "a" and "b" and deletion "e" have been copied with priority on later designation.

Finally, the data on the plane memory PW2 for work are developed as area commands IS. In the development processing ($1111_B$) in this case, the data on the plane memory PW2 for work are copied on the plane memories P0–P3 by inverted OR logic processing. Then, as shown in FIG. 8F, the plane memory PW2 for work is cleared. Here, area commands 1 and 2 are for coloring, and the area command 15 is for deletion.

Figure 11:
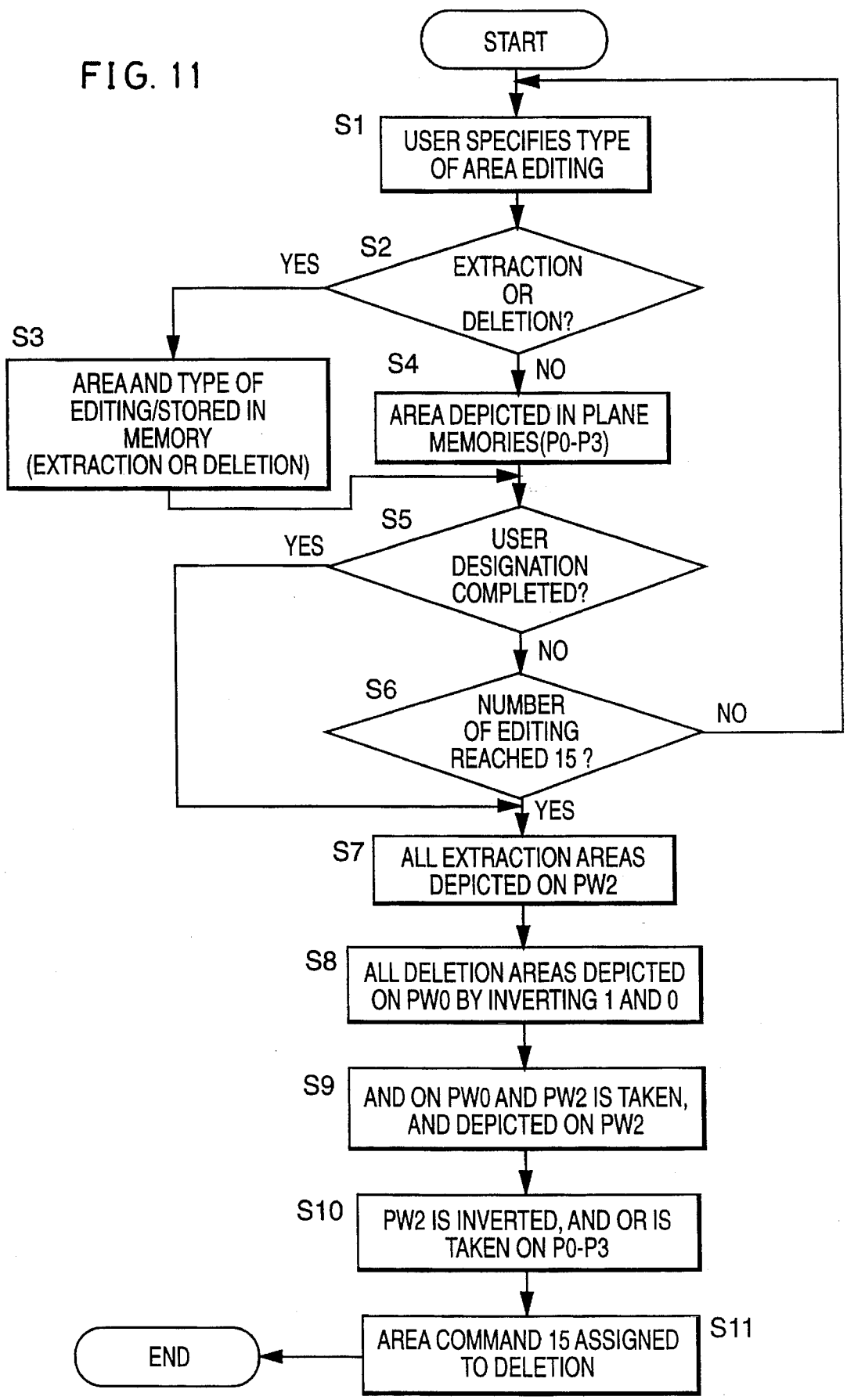
FIG. 11 is a flow chart of plane memory development processing.

The above procedure is given in a flow chart of FIG. 11.

When a user specifies the type of area editing, it is judged whether the type of editing is extraction or deletion (Steps S1–S2). If the answer is NO (i.e, neither extraction nor deletion), the area is depicted on plane memories P0–P3. If the answer is YES (either extraction or deletion), the area and the type of editing, i.e. extraction or deletion, are stored in memory (Steps S3–S4).

Next, it is judged whether user designation is completed or not. If the answer is NO (designation not completed), it is judged whether the number of editing is 15 or not. If the answer is NO (not 15 yet), the procedure returns to Step S1 (Steps S5–S6).

If the answer is YES (user designation is completed, or designation limit 15 has been reached) in the judgment steps S5 and S6, all extraction areas are depicted on the plane memory PW2 for work as explained in FIGS. 8G–8L. Then, all deletion areas are depicted on the plane memory PW0 for work by inverting 1 and 0 as explained in FIGS. 8M–8P (Steps S7–S8). Next, as explained in FIG. 8Q, AND on the plane memories PW0 and PW2 for work is taken, and it is depicted on the plane memory PW2 for work (Step S9).

Finally, the content of the plane memory PW2 for work is inverted. OR processing is performed on the plane memories P0–P3, and the area command 15 is assigned to deletion (Steps S10–S11).

Next, description will be given on an arrangement example of the image processing system, to which the present invention is applied.

Figure 9A:
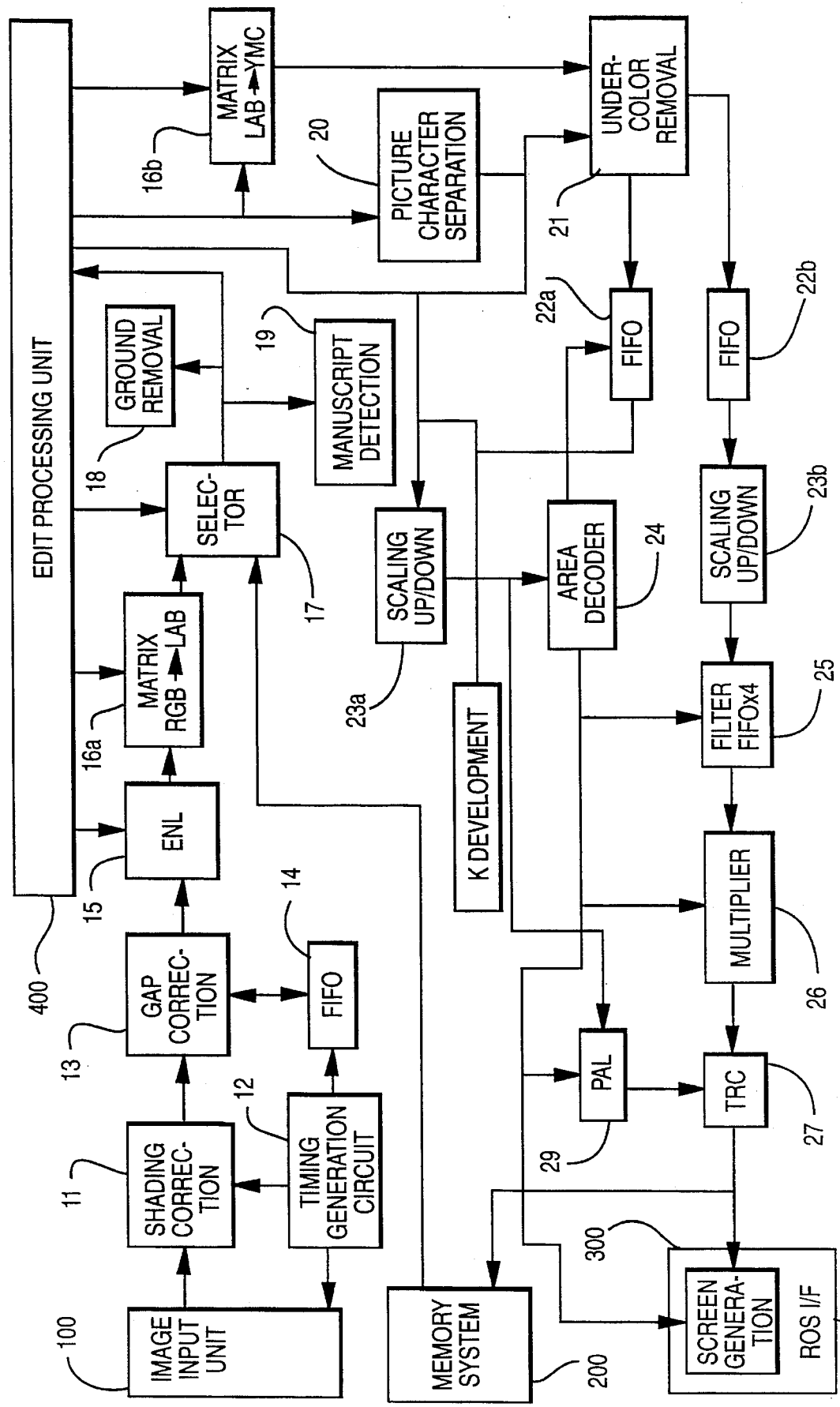
FIGS. 9A and 9B show a block diagram of a signal processing system of an image processing system.
Figure 9B:
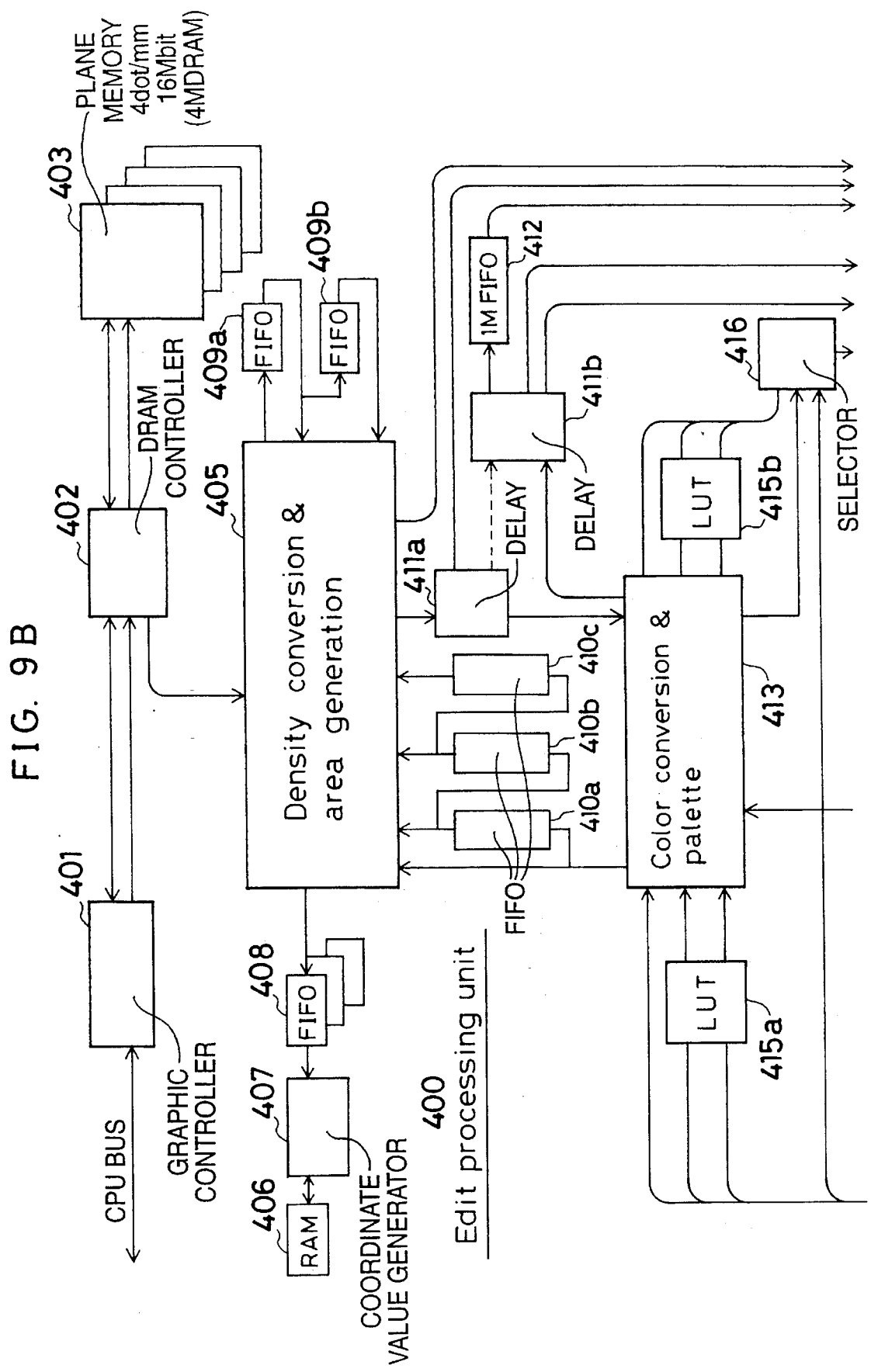

In FIG. 9, an image input unit 100 is an IIT comprising a reduced type sensor, which contains 3 CCD line sensors for B, G and R arranged perpendicularly to slow scanning direction. It reads the image by scanning in fast scanning direction synchronized with a timing signal from a timing generation circuit 12 while moving in a slow scanning direction at a speed corresponding to the ratio of scaling up or down. Analog image data are converted to digital image data of 8 bits, for example, with gradation expression. To this image data, shading correction is performed in a shading correction circuit 11 for variations between pixels caused by various reasons. In a gap correction circuit 13, a gap between line sensors is corrected. In gap correction, image data of B, G and R at the same position can be obtained at the same time by delaying image data, which have been read as corresponding to the gap of CCD line sensor in FIFO 14. ENL (equivalent neutral lightness) conversion circuit 15 performs gray balance processing of image data using parameters corresponding to the type of the manuscript. By a negative/positive inversion signal from an edit processing unit 400 to be explained later, negative and positive are inverted by reversing gray balance for each pixel. For example, negative and positive can be inverted only in a certain specified area.

The image data of B, G and R processed in the ENL conversion circuit IS are converted to uniform color space signals L*, a* and b* in a matrix circuit 16a. Uniform color space signals L*, a* and b* have coordinate axes perpendicular to each other, and L* represents lightness and a* and b* represents chromaticity (hue and saturation). By converting to the uniform color space signals L*, a* and b*, it becomes easier to make an interface with an external computer through a memory system 200, and it also makes it easier to perform color conversion, edit processing or image information detection. A selector 17 selectively picks up an output of the matrix conversion circuit 16a or image data from the memory system 200, which has an interface with outside devices or performs processing such as texture synthesizing or transparency synthesizing by selectively picking up or by incorporating both image data. For this reason, the selector 17 is provided with the functions to carry out the setting of synthesis ratio, computation and synthetic processing for a synthesized image.

Ground removal circuit 18 prepares a histogram for manuscript density in pre-scanning and detects background density, and it contributes to the improvement of copy quality to the manuscript in printing such as newspaper by jumping the pixels below the background density. Manuscript detection circuit 19 detects the boundary between the rear surface of black platen and the manuscript and obtains a circumscribed rectangle in order to detect and memorize manuscript size. In the ground removal circuit 18 and the manuscript detection circuit 19, the signal L* for lightness information is used from the uniform color space signals of L*, a* and b*.

In the edit processing unit 400, area commands are set for switching of edit processing or parameters for each area and an area control signal based on the area commands is generated, and color editing, color conversion, marker color detection and other processing are performed to the image data. After this processing, the image data are inputted to a matrix conversion circuit 16a and a picture character separation circuit (TIS circuit) 10.

For the image data after edit processing, the signal is converted from L*, a* and b* in the matrix conversion circuit 16a, to toner colors of Y, M and C. In the picture character separation circuit 20, a plurality of pixels are turned to blocks, and areas are identified as color character/black character/picture pattern (character/intermediate tone). In under-color removal circuit 21, black plate (K) is generated according to signals of mono-color/full-color from the image data of Y, M and C converted at the matrix conversion circuit 16b, and equivalent removal for Y, M and C is carried out. The image data of process color are outputted, and hue signal is generated by judging the hue. During identification processing at the picture character separation circuit 20, a 12-line delay occurs, for example, in the signal for area identification because of blocking. FIFOs 22a and 22b have timing for synchronizing hue signal and image data to this delay.

Scaling up/down circuit 23b performs scaling up/down processing for image data based on a scaling up/down ratio as specified. Scaling up/down is performed by changing the scanning speed according to the scaling up/down ratio at the image input unit 100 for the slow scanning direction. Here, the image data are thinned out or interpolated for the fast scanning direction. The scaling up/down circuit 23a scales up or down the area commands so that execution area for area control information is not deviated relative to the scaling up/down processing to the image data. The area control information thus scaled up or down is decoded by an area decoder 24 and is offered for the processing of each processing block. The area decoder 24 generates and distributes area identification signal area commands, a hue signal, a filter parameter 25, a coefficient of a multiplier 26, and a switching signal for a parameter of TRC circuit 27.

Filter 25 performs moiré removal for intermediate tone or edge enhancement for characters depending on space frequency of the image data, which have been scaled up or down by the scaling up/down circuit 23b. TRC circuit 27 adjusts density according to the characteristics of the IOT using a conversion table, and PAL 29 is a decoder to change parameters on the conversion table of TRC circuit 27 by a development process or area identification signals. The multiplier 26 carries out computation of "ax+b" to the image data x using coefficients "a" and "b". The coefficient is changed to slew in case of intermediate tone, and to high Y in case of characters. By using this change in combination with TRC circuit 27 and adequately selecting coefficients and conversion table to each color component, color adjustment and density adjustment can be performed to color character, black character and picture pattern. Also, the parameters of the filter 25 can be standardized, and edge enhancement of characters can be adjusted by the coefficients "a" and "b". The image data adjusted in this way are memorized in the memory system or outputted as half-tone image through dot development at a screen generation unit 28 of ROS 300.

The edit processing unit 400 performs color conversion, color editing and generation of area control signals, and the image data L*, a* and b* from the selector 17 are inputted. Color information is converted from a*, and b* in orthogonal coordinates to C and H in polar coordinates to facilitate marker color and other color detection, color editing, and color conversion by LUT 415a. Color conversion and palette 413 has colors used for color conversion and color editing on 32 types of palettes and performs processing such as marker color detection, color editing, color conversion, etc. to the image data L*, C and H according to the area command inputted through a delay circuit 411a. Only the image data in an area where color conversion and other processings are carried out are processed on the color conversion & palette 413. After reverse conversion from C and H to a* and b* at LUT 415b, the image data of the other areas are outputted directly for a selector 416 and are sent to the matrix conversion circuit 16b as described above.

During pre-scanning, marker colors (3 colors) detected from the image data at the color conversion & palette 413 and 4-bit signal in a closed area are sent to a density conversion & area generation circuit 405. In the density conversion & area generation circuit 405, density conversion from 400 spi to 100 spi is carried out through binarization processing at a window of 4×4 using FIFOs 410a, 410b and 410c to turn to "1" if there are more black pixels than the predetermined number among 16 pixels. The marker signal (closed loop or marker dot) generated in this way is written on a plane memory 403 through DRAM controller 402 by the density conversion & area generation circuit 405.

During pre-scanning, the marker dot signal is delayed by 3 lines by FIFO 408 so that small dust particles are not erroneously detected as a marker and the signal is turned to 3×3 window. The marker dots are detected and coordinate values are generated by a coordinate value generation circuit 407 and are stored in RAM 406. The marker dots are also stored in the plane memory 403. This is to prevent erroneous detection.

The plane memory 403 is a memory to store area command for color conversion, color editing and other area editing. For example, it is possible to specify an area from an edit pad and to write an area command in this area. Specifically, the area command of the area specified by the edit pad is transferred to a graphic controller 401 through a CPU bus, and it is written on a plane memory 403 through DRAM controller 402 from the graphic controller 401. The plane memory 403 has 4 sides and can set 16 types of area commands from 0 to 15.

A 4-bit area command stored in the plane memory 403 is read in synchronization with the image data output and is used for such purposes as: edit processing in the color conversion & palette, switching of parameters in image data processing system of FIG. 9A, ENL conversion circuit 15 and matrix conversion circuit 16, selector 17, under-color removal circuit 21, filter 25 through area decoder 24, multiplier 26, TRC circuit 27 screen generation unit 28, etc. When this area command is read from the plane memory 403 and is used for switching of the parameters for edit processing in the color conversion & palette 413 or in image data processing, it is necessary to convert density from 100 spi to 400 spi, and this is carried out by density conversion & area generation circuit 405. In the density conversion & area generation circuit 405, 3×3 blocking is performed using FIFOs 409a and 409b. Through data interpolation from this pattern, density conversion from 100 spi to 400 spi is performed so that the closed loop curve or boundary of editing area does not become irregular. Delay circuits 411a, 411b and IMFIFO 412 and others are used for timing adjustment between area command and image data.

Figure 10:
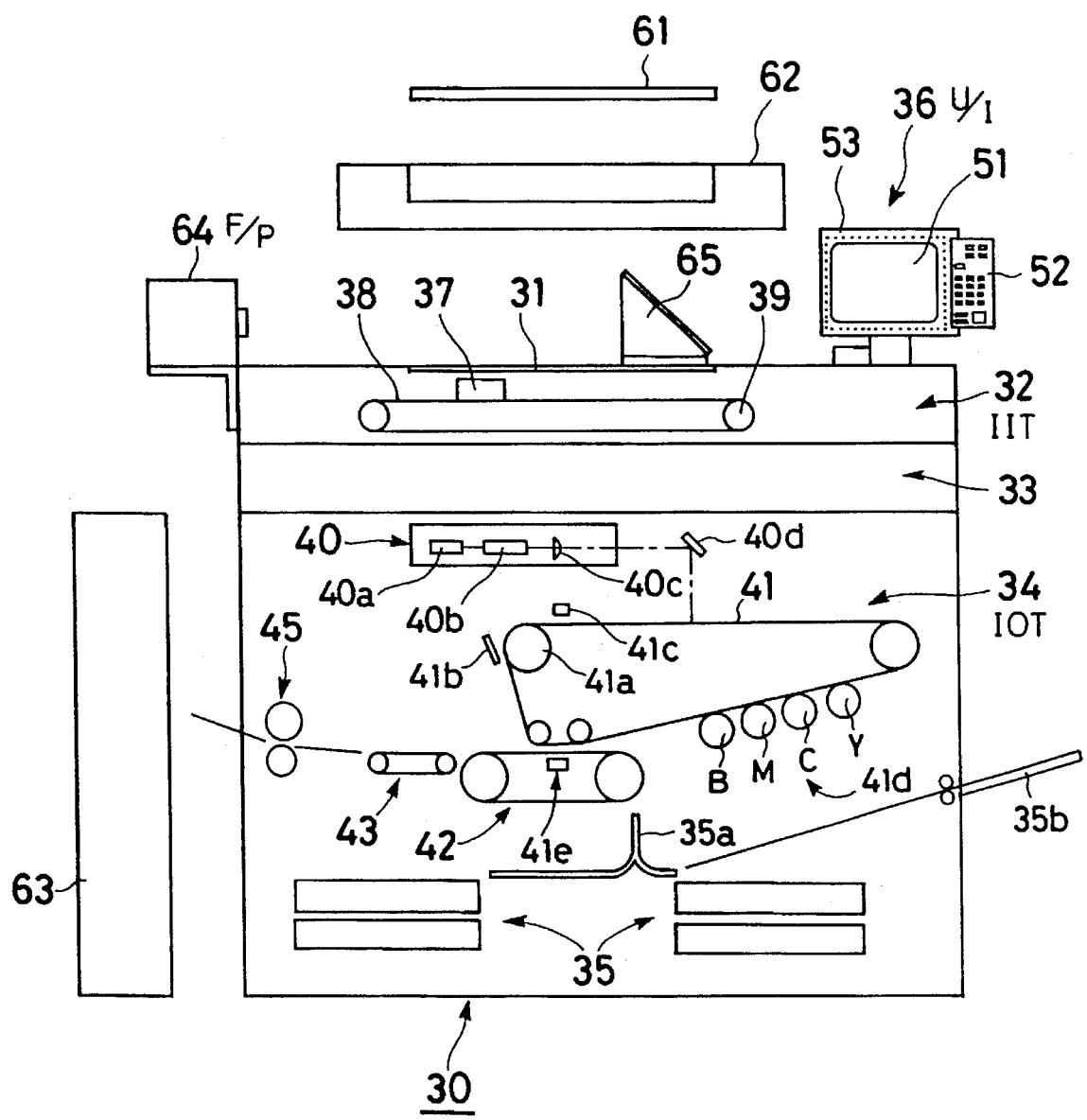
FIG. 10 shows an arrangement of mechanism of an image processing system.

The color copying machine shown in FIG. 10 comprises a platen glass 31 where a manuscript is to be placed on its top, an image input terminal (IIT) 32, an electric system control housing 33, an image output terminal (IOT) 34, a paper tray 35, and a user interface (U/I) 36. As optional items, there are an edit pad 61, an auto document feeder (ADF) 62, a sorter 63, and a filter image reading unit comprising a film projector (F/P) 64 and a mirror unit (M/U) 65.

The image input terminal 32 comprises an imaging unit 37, and wire 38, driving pulley 39, etc. to drive it. The image information of a color manuscript after color separation into primary colors of B (blue), G (green) and R (red) by color filter in the imaging unit 37 and read by a CCD sensor is converted to multi-gradation digital image data BGR and is outputted to the image processing system. The image processing system is accommodated in the electric system control housing and inputs the image data of BGR and performs various processings such as conversion correction and edit processing in order to improve picture quantity and reproducibility in color, gradation, definition, etc., and the image data are converted to toner primary colors of Y (yellow), M (magenta), C (cyan) and R (black). Gradation toner signal of process color is converted to ON/OFF binarized toner signal and is outputted to the image output terminal 34. The image output terminal 34 comprises a scanner 40 and a sensitized material belt 41, and the image data are converted to light signal at a laser output unit 40a. Through a polygonal mirror 40b, F/θ lens 40c and a reflection mirror 40d, a latent image corresponding to the image on the manuscript is formed on the sensitized material belt 41. The image is transferred to paper transported from the paper tray 35, and a color copy is discharged.

In the image output terminal 34, the sensitized material belt 41 is driven by a driving pulley 41a, and a cleaner 41b, a charger 41c, developing machines 41d, one each for each of Y, M, C and K, and a transfer machine 41e are arranged around it. A transfer unit 42 is placed face-to-face to this transfer machine 41e. Paper sent from the paper tray 35 through paper transport passage 35a is caught. In case of a 4-color full-color copy, the transfer unit 42 is rotated by 4 turns to transfer each latent image for Y, M, C and K on paper. Then, paper is passed from the transfer unit 42 to a fixing unit 45 through a vacuum carrier 43 and is discharged. SSI (single sheet inserter) 35b selectively feeds the paper manually to the paper transport passage 35a.

The user interface 36 selects the function desired by the user and instructs the condition for execution. It is provided with a color display 51 and a hard control panel 52, and the instruction can be directly given by soft button on the screen in combination with an infrared touch board 53.

The electric system control housing 33 is to accommodate a plurality of control boards for each processing unit such as image input terminal 32, image output terminal 34, user interface 36, image processing system, and a film projector 64, and further, MCB boards (machine control board) to control the operation of image output terminal 34, automatic manuscript feeder 62, sorter 63, etc. and SYS board to control the entire system.

The present invention is not limited to the above embodiment and various changes and modifications can be made. For example, area commands are stored in 4 planes in the above embodiment, whereas 5 or more planes may be used or 3 or less planes may be used.

As explained in the above, the extraction and deletion areas are finally synthesized on the plane memories for work, and the commands are collectively developed on the plane memories for command. Thus, it is possible to simplify development processing of the plane memories and to reduce the processing time. In particular, it is useful for edit processing of the manuscript such as a table, where there are many areas and deletion areas.

What we claim is:

1. An image edit processing system for executing edit processing of image data by storing an edit command for each area of an image, comprising:

image input means for inputting said image data;

image processing means, comprising a plurality of plane memories for storing at least one edit command; and edit processing means for storing and reading each said edit command to said plane memories based on an edit function and on instructions for designation and execution for each said image area and for executing edit processing of said image data inputted from said image input means;

image output means for outputting said image data processed through edit processing by said image processing means;

user interface means for inputting a designation of each said image area and for inputting a user command including a command for executing edit processing; and control means for executing the user command in order to designate each of said image areas, whereby:

said plane memories consist of a plurality of plane memories for work and a plurality of plane memories for storing area commands for each designated image area;

said edit processing means stores data for areas other than extracted and deleted areas in a second memory of said plane memories for work, and copies the stored data for said other areas to at least one plane memory for storing said area commands;

data for said extracted area are then stored in the second memory of said plane memories for work, said data for said extracted area are copied to a third memory of said plane memories for work, data to be stored in the first memory of said plane memories for work are presented to the first memory of said plain memories for work, data for said deleted area are stored in the second memory of said plane memories for work, said data for said deleted area are inverted and copied to the first memory of said plane memories for work, said data for said deleted area copied in the first memory of said plane memories for work are copied and combined, with priority on later designation, with said data for said extracted area copied in the third memory of said plane memories for work, and said combined data for said deleted and extracted areas are copied together, with said priority on later designation, to said at least one plane memory for storing area commands where data for areas other than extracted or deleted areas are copied.

2. The image edit processing system according to claim 1, wherein said edit processing means copies areas other than said extracted or deleted areas depicted by a logic "1" in the second memory of said plane memories for work to one of said plane memories for storing area commands by OR logic processing, and these other areas are copied to the remaining plane memories for storing area commands by inverted AND processing.

3. The image edit processing system according to claim 1, wherein said edit processing means copies said extracted area stored in the second memory of said plane memories for work to the third memory of said plane memories for work by OR logic processing.

4. The image edit processing system according to claim 1, wherein said edit processing means copies said deleted area from the first memory of said plane memories for work to said extracted area copied on the third memory of said plane memories for work by AND processing.

5. The image edit processing system according to claim 1, wherein said edit processing means copies said combined data for said extracted and deleted areas copied on said third memory of said plane memories for work to all of said plane memories for storing area commands, where data for areas other than said extracted or deleted areas are copied by inverted OR processing, with said priority on later designation.

6. The image edit processing system according to claim 4, wherein said edit processing means designates logic "1" on said first plane memory of said plane memories for work and copies said deletion area copied to the second memory of said plane memories for work by inverted AND processing.

7. The image edit processing system according to claim 5, wherein said edit processing means develops said deletion and extraction areas by a command, which refers to all of said plane memories for storing area commands, stored with the logic "1".

* * * * *